No. 733,711. PATENTED JULY 14, 1903.
J. R. FLOOD, W. E. SAYER & A. D. CAMPBELL.
ELECTRICAL WATER LEVEL INDICATOR, RECORDER, AND ALARM.
APPLICATION FILED APR. 23, 1903.
NO MODEL.
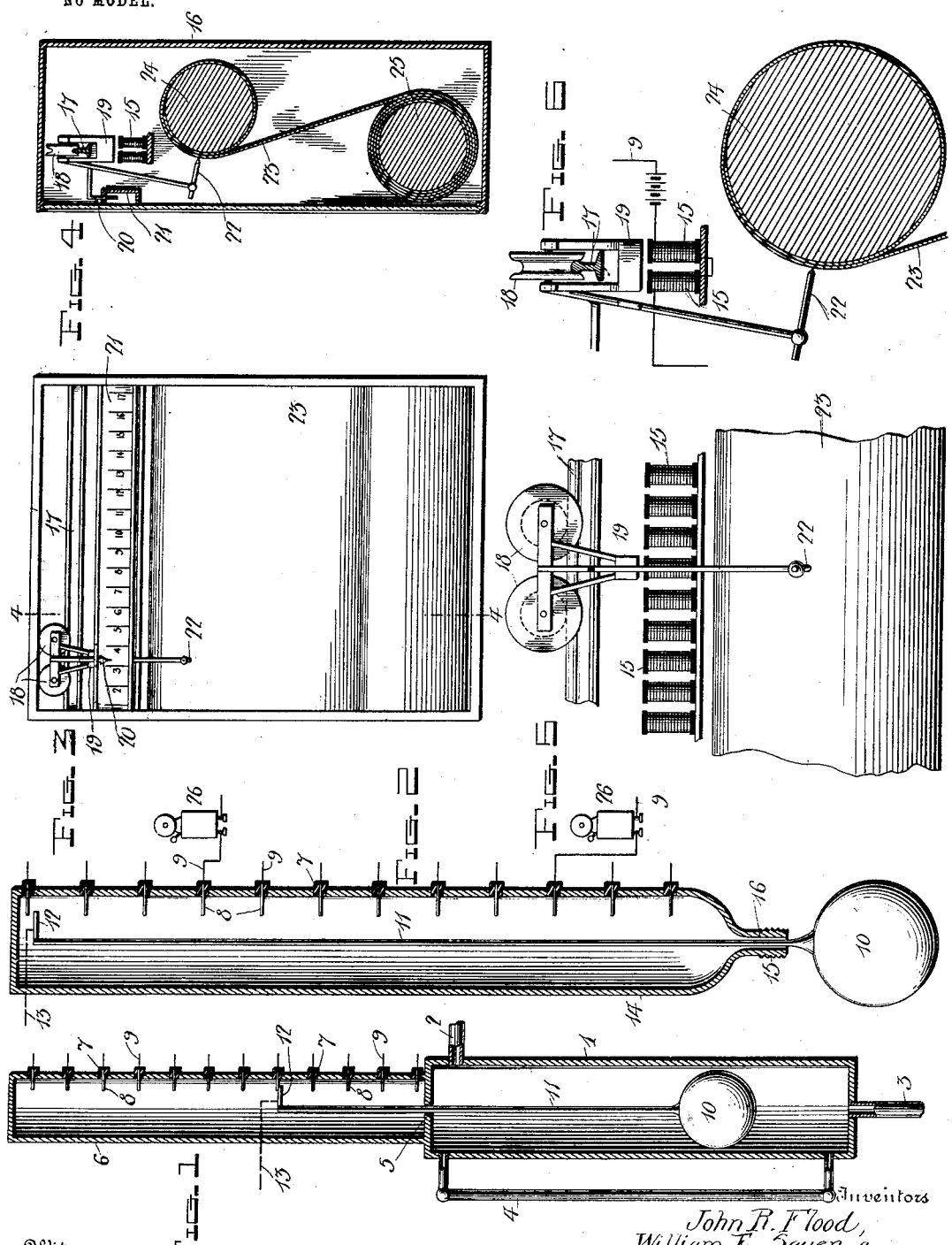
Witnesses
Inventors
John R. Flood,
William E. Sayer and
Albert D. Campbell.
By
their Attorneys No. 733,711. Patented July 14, 1903.

UNITED STATES PATENT OFFICE.

JOHN R. FLOOD, WILLIAM E. SAYER, AND ALBERT D. CAMPBELL, OF SPOKANE, WASHINGTON.

ELECTRICAL WATER-LEVEL INDICATOR, RECORDER, AND ALARM.

SPECIFICATION forming part of Letters Patent No. 733,711, dated July 14, 1903.

Application filed April 23, 1903. Serial No. 153,916. (No model.)

*To all whom it may concern:*

Be it known that we, JOHN R. FLOOD, WILLIAM E. SAYER, and ALBERT D. CAMPBELL, citizens of the United States, residing at Spokane, in the county of Spokane and State of Washington, have invented certain new and useful Improvements in Electrical Water-Level Indicators, Recorders, and Alarms; and we do hereby declare the following to be a full, clear, and exact description of the invention, such as will enable others skilled in the art to which it appertains to make use of the same.

This invention, which relates to electrical signaling appliances, contemplates the provision of improved means operating in connection with a float to indicate and record the water-level more particularly in steam-boilers, and to actuate an alarm-signal when the water-level approaches the high or the low danger-point.

The nature of the invention will be readily comprehended, reference being had to the following detailed description and to the accompanying drawings, illustrating the invention in its preferred form, it being understood that various modifications may be made therein without departing from the spirit of the invention defined by the concluding claims.

In the drawings, Figure 1 is a water column equipped with a float and contact-maker embodying our invention. Fig. 2 is a similar view, but showing the parts applied to tube adapted for connection with a boiler. Fig. 3 is a front elevation of an indicating and recording appliance forming part of our invention. Fig. 4 is a sectional view on line 4 4 of Fig. 3. Figs. 5 and 6 are respectively enlarged elevation and sectional detailed views of a part of the indicating and recording appliance.

Referring to the drawings by numerals, 1 denotes a steam-tight water column or casing, preferably of the cylindrical form shown and connected by pipes 2 3 with the water-holder, which may be a steam-boiler.

4 is a sight water-gage.

Above the casing 1 and communicating therewith by a restricted opening 5 is an extension cylindrical casing 6, in the wall of which is a vertical series of openings filled by plugs 7 7 of insulating material, in each of which is fixed a contact 8. A circuit wire 9 leads from each contact through the plug 7.

10 is a preferably spherical float, movable in the casing 1 with the rise and fall of the water, and to which is connected a stem 11, leading through the opening 5 into the upper casing 6, the stem carrying at its upper end a contact 12. In the movement of the float the contact 12 is brought successively into engagement with the fixed contacts 8 8 to close an electric circuit, which is normally open. A circuit wire 13 leads from the contact 12 to ground.

In Fig. 2 is shown a cylindrical casing or tube 14, having a screw-threaded lower end 15 for connection with the shell of a steam-boiler and in a restricted opening 16 in the lower end of which the stem 11 of the float 10 moves. The stem is provided with a contact 12, and 8 8 are contacts extending inwardly from the wall of the tube 14.

Each of the wires 9 is independently connected in normally open circuit with a pair of magnets 15 15, the series of pairs of magnets, which correspond in number with the number of contacts 8 8, being supported in horizontal alinement in the upper end of a case 16. Above the series or magnets is a rail 17, on which is slidingly supported through the medium of grooved wheels 18 18 an armature 19, carrying a pointer 20, which, in connection with a scale 21, indicates the water-level, and also carrying a tracer 22, arranged to record the varying water-level on a sheet 23, wound on revoluble rolls 24 25.

In operation the contacts 8 8 are successively engaged by the contact on the moving float-stem, the separate circuits are established, and the pairs of magnets successively energized as the circuits are closed, thereby imparting to the armature a step-by-step movement through the attractive influence on the armature by successively-energized magnets. The pointer 20 and tracer 22, being carried by the armature, respectively indicate and record the water-level on the boiler or other water reservoir, tank, or the like.

To signal the approach of the water to a danger-level, either high or low, there is provided in certain of the circuits an audible signal, such as the alarm-bell 26 shown. It will be understood that the circuits include batteries of the proper strength and that the wiring is such as to provide a normally open circuit, which is successively closed and opened in either the rise or fall of the float, and that only one pair of magnets is energized at a time.

The alarm, indicator, and recorder may be located at any point near to or remote from the boiler, reservoir, or other receptacle, but, preferably, the alarm is located to be near the attendant to insure prompt action in the event of the water-level reaching a dangerous high or low point.

We claim as our invention—

1. In combination, a casing, a float movable therein and carrying a contact, a series of fixed contacts in the path of the movable contact, and a water-level indicator in electric circuit with said contacts consisting of a series of successively-energized magnets, an armature slidably mounted to be moved by the attractive power of said magnets, a pointer carried by the armature, and an indicating-scale in the path of the pointer.

2. In combination, a casing, a float movable therein and carrying a contact, a series of fixed contacts in the path of the movable contact, and a water-level recorder in electric circuit with said contacts consisting of a series of successively-energized magnets, an armature slidably mounted to be moved by the attractive power of said magnets, a tracer carried by the armature, and a movable recording-sheet at said tracer.

3. In combination, a casing, a float movable therein, electric-circuit making and breaking means carried by the float and casing, a series of magnets adapted to be successively energized in the movement of the float, a slidably-mounted armature arranged to be moved by the energized magnets, and an indicating-scale pointer and a recording-tracer carried by said armature.

In testimony whereof we affix our signatures in presence of two witnesses.

JOHN R. FLOOD.
WILLIAM E. SAYER.
ALBERT D. CAMPBELL.

Witnesses:
A. W. WITHERSPOON,
E. STANDLEY.